Aug. 23, 1938.  C. C. FARMER ET AL  2,128,084
FLUID PRESSURE BRAKE
Filed Oct. 10, 1934  3 Sheets-Sheet 3
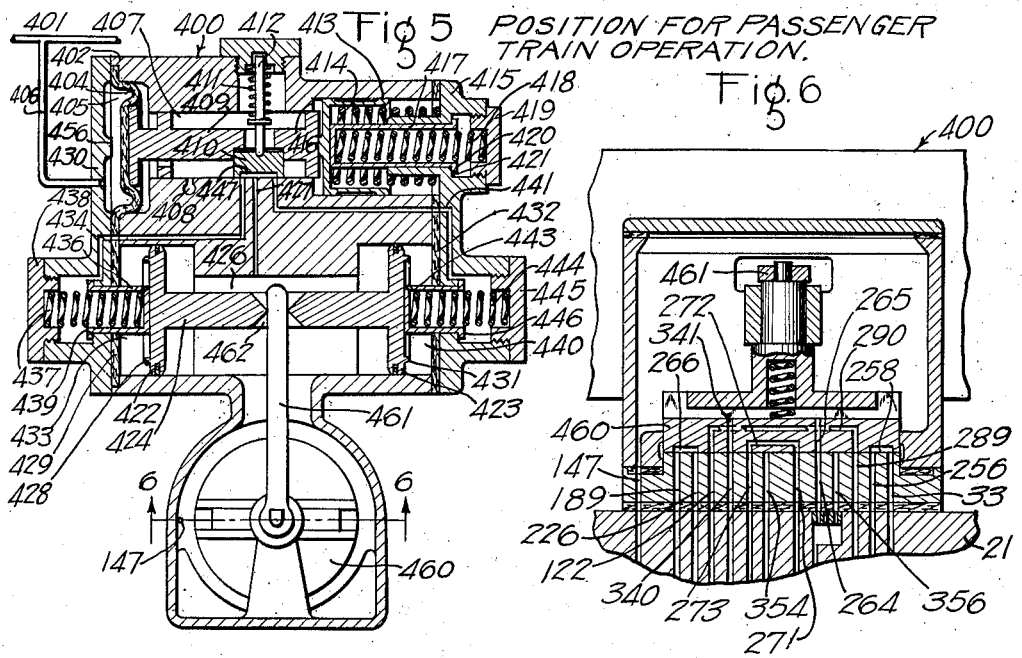
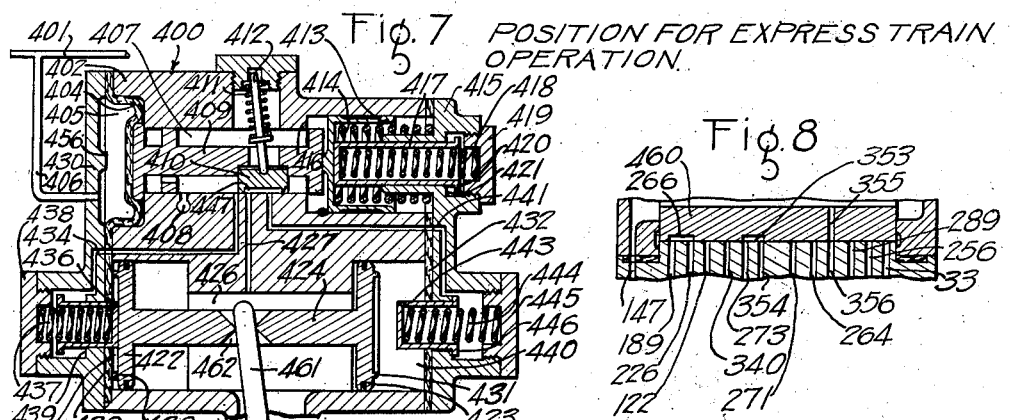
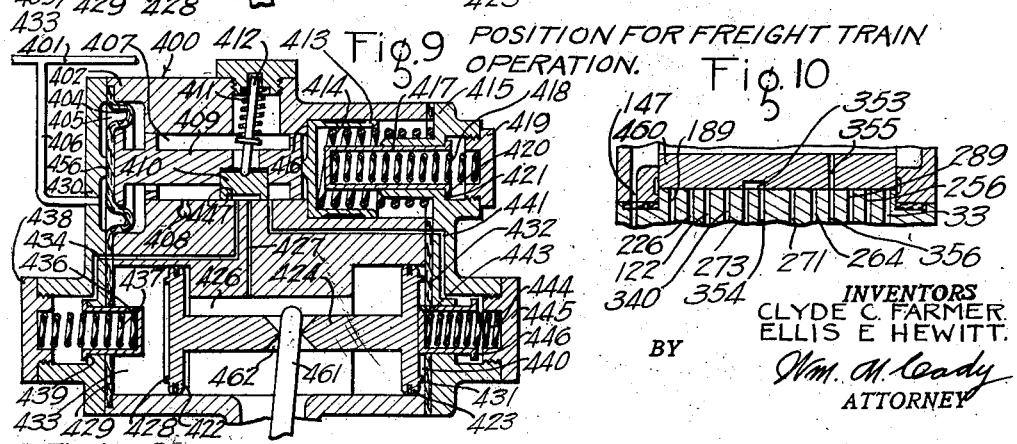
INVENTORS
CLYDE C. FARMER.
ELLIS E. HEWITT.
BY
Wm. M. Cady
ATTORNEY Patented Aug. 23, 1938

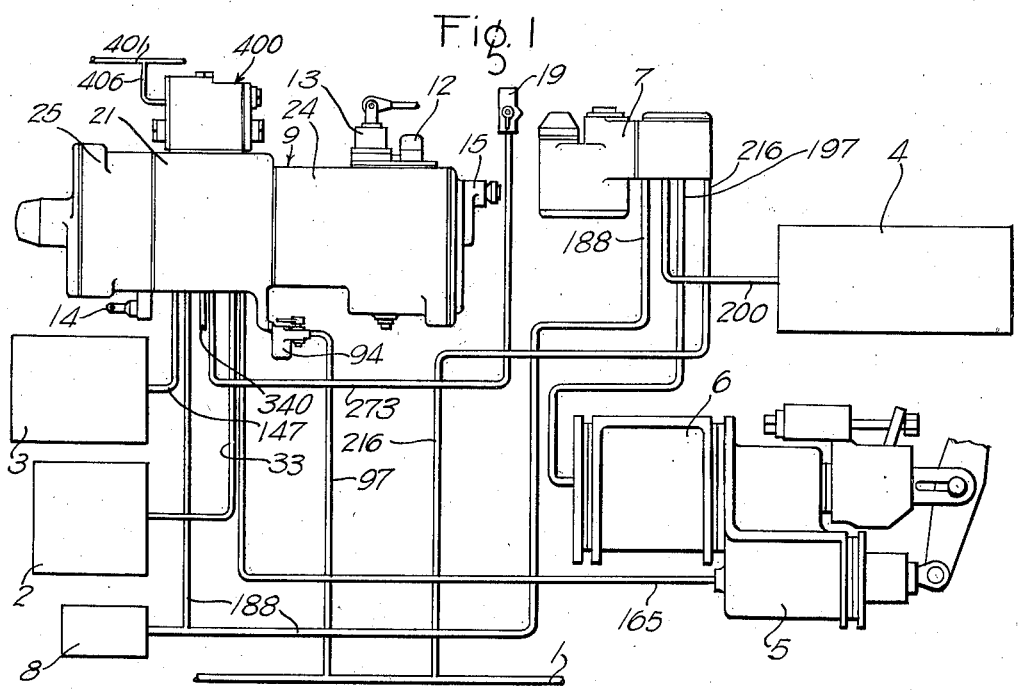
Fig. 1
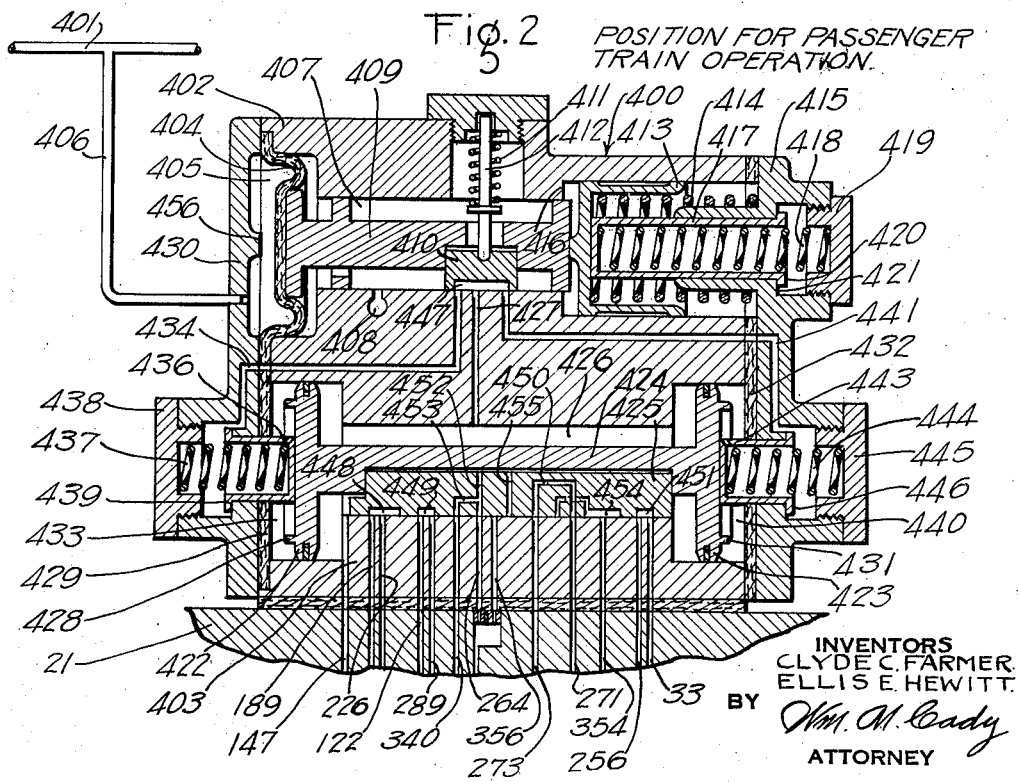
Fig. 2 POSITION FOR PASSENGER TRAIN OPERATION.
INVENTORS
CLYDE C. FARMER.
ELLIS E. HEWITT.
BY Wm. M. Cady
ATTORNEY

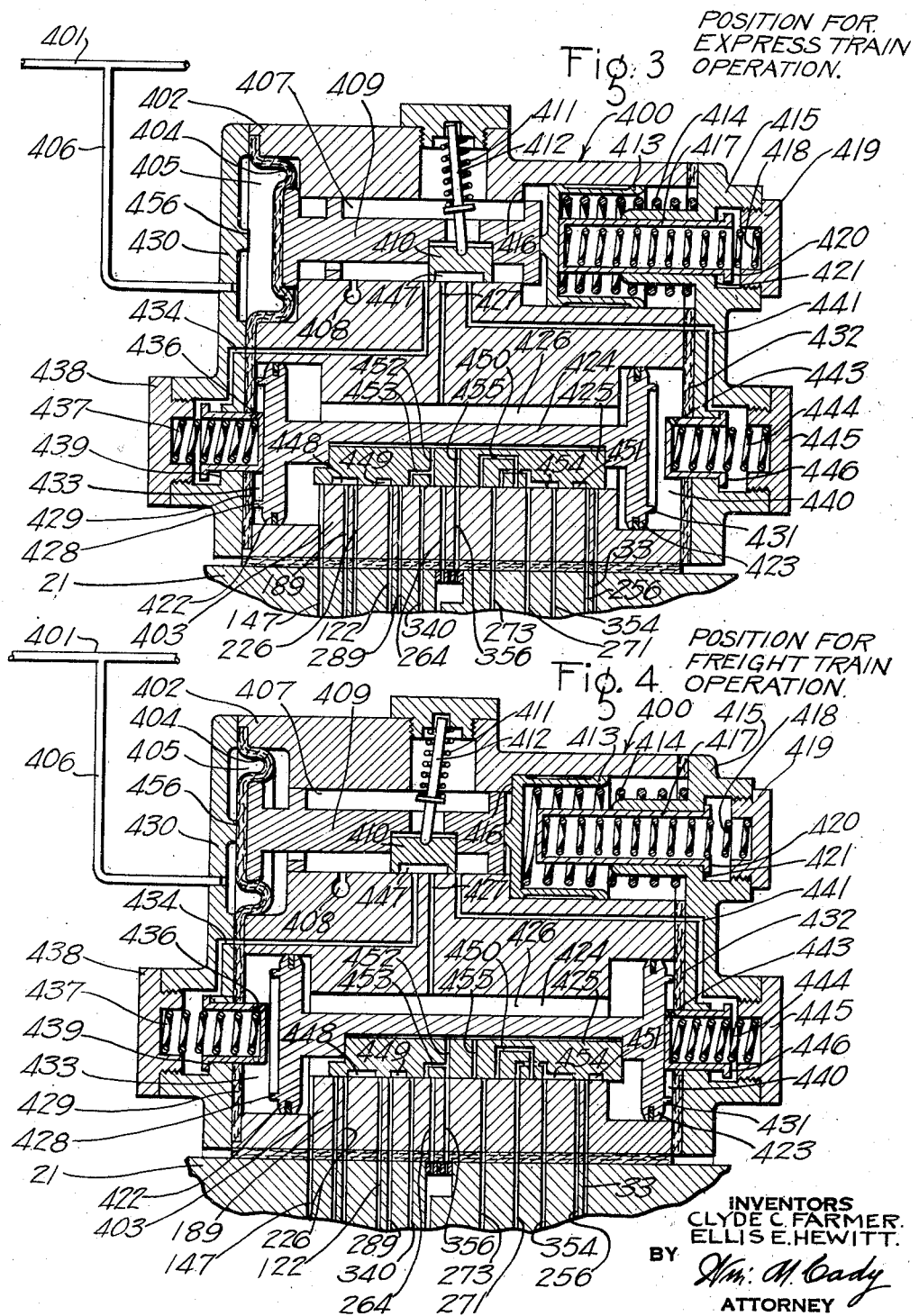

2,128,084

UNITED STATES PATENT OFFICE 2,128,084

FLUID PRESSURE BRAKE

Clyde C. Farmer, Pittsburgh, and Ellis E. Hewitt, Edgewood, Pa., assignors to The Westinghouse Air Brake Company, Wilmerding, Pa., a corporation of Pennsylvania Application October 10, 1934, Serial No. 747,734

37 Claims. (Cl. 303—23)

This invention relates to fluid pressure brake equipment of the type which may be readily changed over or conditioned to meet the braking requirements of one or another of a plurality of classes of railway train service, and relates more particularly to the means for changing over or conditioning the equipment to function properly in the particular service in which it is employed.

The railroad companies have provided several very important classes of train service, such for instance as passenger, express and freight, and have designated and equipped certain cars for the particular service in which they are to be employed. It is well known that the fluid pressure brake requirements of the three enumerated classes of service differ from each other to such an extent, that while a fluid pressure brake equipment may be adequate for one class of service, it may be entirely inadequate for the other two classes of service. This will be understood when it is remembered that passenger trains are comparatively short and are operated on high speed schedules, that express trains are usually longer than passenger trains and are operated on speed schedules approaching passenger train schedules, and that freight trains are generally much longer than express trains and are operated on slower speed schedules.

Modern transportation requirements are such that cars equipped for one class of service may also be employed in the other classes of service, so that under normal train operating conditions it is not uncommon for a train in any particular service to include cars equipped for any other service, for instance, it is not uncommon for passenger, express and freight trains to include passenger equipment cars, express cars and freight cars.

It has heretofore been the common practice to apply fluid pressure brake equipment designed for passenger service to the cars to be employed in express train service, but, for example, since passenger and express cars are sometimes included in long freight trains and the operating characteristics of passenger and freight brake equipment differ so much from each other, such equipments cannot operate in harmony with each other when operated in the same train and, therefore, will not fully meet the present transportation requirements.

To meet the braking requirements of the several classes of transportation service above enumerated, a brake equipment capable of being changed over or conditioned for different classes of train service, by means of a manually operative change-over valve device, has been proposed by us and made the subject of our pending joint application, Serial No. 743,546, filed September 11, 1934.

The principal object of the present invention is to provide means for automatically changing over or conditioning a fluid pressure brake equipment for use in any one of a plurality of classes of train service.

Another object of the invention is to provide a fluid pressure brake equipment capable of meeting the different braking requirements of a plurality of classes of train service with a change-over valve device, which, when a car having such equipment applied thereto is placed in a train for a certain class of service or is transferred from said train to a train in another class of service, will operate automatically to change over or condition the equipment for the particular service in which the car is to be employed.

Other objects and advantages will appear in the following more detailed description of the invention.

In the accompanying drawings, Fig. 1 is a diagrammatic view of a fluid pressure brake equipment embodying the invention; Fig. 2 is an enlarged diagrammatic sectional view of a change-over valve device for conditioning the brake equipment, said device being shown in the position for conditioning the brake equipment for passenger train service; Fig. 3 is an enlarged diagrammatic sectional view showing the change-over valve device in the position for conditioning the brake equipment for express train service; Fig. 4 is an enlarged diagrammatic sectional view showing the change-over valve device in the position for conditioning the brake equipment for freight train service; Figs. 5 to 10, inclusive are diagrammatic sectional views of another type of change-over valve device in which a rotary valve is employed to effect the conditioning of the fluid pressure brake equipment, Figs. 5, 7 and 9 illustrating the change-over valve device in position to condition the fluid pressure brake equipment for passenger, express, and freight train service, respectively, and Figs. 6, 8 and 10 are fragmentary cross sectional views of the change-over valve device illustrating the rotary valve in position for passenger, express and freight train service, respectively, Fig. 6 being taken on the line 6—6 of Fig. 5.

In the accompanying drawings, the reference character 400 indicates a change-over valve device, which, when associated with a fluid pressure brake equipment adapted to be condtioned to meet the braking requirements of any one of a plurality of classes of train service, is automatically operable to effect such conditioning.

For illustrative purposes only, the change-over valve device 400 is shown associated with a fluid pressure brake equipment, which, with the exception of the change-over valve device, may be substantially identical with the equipment fully shown, described and claimed in the aforementioned pending application. This brake equipment is adapted to be changed over or conditioned for either passenger train service, express train service or freight train service.

Since, as just pointed out, the brake equipment, with the exception of the change-over valve device is substantially identical with the equipment disclosed in the above mentioned pending application, the following detailed description will be limited more or less to the change-over valve device and its functions; however the several other parts of the equipment will be briefly described in order to clearly bring out the cooperative relationship between the change-over valve device 400 and the remainder of the fluid pressure brake equipment.

In order to simplify the drawings and description of the present invention, the devices and parts of the present equipment which correspond to those of the equipment disclosed in the aforementioned pending application, are identified by the same reference characters as used in said pending application.

The fluid pressure brake equipment shown in Fig. 1 of the drawings comprises a brake pipe 1, an auxiliary reservoir 2, an emergency reservoir 3, a supply reservoir 4, a take-up cylinder device 5, a brake cylinder 6, a relay valve device 7, a volume reservoir 8, a brake controlling valve mechanism 9 comprising a pipe bracket 21, an equalizing valve device 24, an emergency valve device 25 and other devices not shown in the drawings, the change-over valve device 400, a quick service modifying or limiting valve device 12, a reservoir release valve device 13, a safety valve device 14, a release insuring valve device 15, a retaining valve device 19, an auxiliary reservoir pipe 33, a combined centrifugal dirt collector and cut-out cock device 94 which is connected to a pipe 97 leading from the brake pipe 1, an emergency reservoir pipe 147, a take-up cylinder pipe 165, a volume reservoir and relay piston chamber pipe 188, a brake cylinder pipe 197, a supply reservoir pipe 200, a supply reservoir charging pipe 216 leading from the brake pipe 1, a pipe 273 leading to the retaining valve device 19, a pipe 340 of a water raising system (not shown), and a signal pipe 401.

The change-over valve device 400 comprises a casing 402 and a slide valve seat 403 which, in the present embodiment of the invention, may be secured to the pipe bracket 21 in any desired manner, and also comprises a change-over valve mechanism and a control mechanism for controlling the operation of the change-over valve mechanism.

The control mechanism just referred to comprises a movable abutment in the form of a flexible diaphragm 404 having at one side a chamber 405 which is connected through a passage and pipe 406 to the signal pipe 401, and having at the other side a chamber 407 which is constantly connected to a passage 408 leading to the atmosphere. Contained in the chamber 407 is stem 409 which is operative to control the movement of a control slide valve 410 also contained in the chamber 407, said slide valve being urged against the slide valve seat by a spring 411 acting through the medium of a plunger 412.

The forward end of the stem 409 is operatively engaged by the flexible diaphragm and the rear end is adapted to be engaged by a combined actuating and stop member 413 which is slidably mounted in the casing and which is subjected to the action of a spring 414 which is interposed between and operatively engages the member and a cover plate 415 secured to one end of the casing, said spring tending at all times, to urge the member toward a stop shoulder 416 formed on the casing and which is adapted to limit the movement of the member in the direction of the stem 409.

Slidably mounted in the cover plate 415 is a stop member 417 which is constantly subject to the pressure of a spring 418 interposed between and engaging the member and a plug 419 having screw-threaded connection with the cover plate 415, said spring at all times, tending to urge the stop member in the direction toward the stop member 413, movement of the stop member 417 in this direction being limited by the engagement of an annular flange 420 thereof with a stop shoulder 421 formed on the cover plate 415. With the member 413 in engagement with the stop shoulder 416 and the flange 420 of the member 417 in engagement with the stop shoulder 421, the free end of the member 417 will be spaced a short distance away from the member 413. As will hereinafter more fully appear, the spring 414 alone, acting through the medium of the member 413, yieldably resists movement of the stem 409 and slide valve 410 in a direction toward the right hand until such time as the member engages the stop member 417, after which this spring, as well as spring 418, acting through the medium of the member 417, yieldably resists movement of the stem and slide valve in this direction.

The change-over valve mechanism comprises spaced pistons 422 and 423 which are rigidly connected together by means of a piston stem 424 which is adapted to shift a slide valve 425 to one or another of three change-over or conditioning positions, said valve being contained in a valve chamber 426 located between the pistons and constantly connected to a passage 147 leading from the emergency reservoir 3. This valve chamber is constantly connected to a control passage 427 leading to the seat for the control slide valve 410. The face of the piston 422 is provided with an annular seat rib 428 which is adapted to engage a gasket 429 which is clamped between the casing 402 and a cover plate 430, and the piston 423 is provided with an annular seat rib 431 which is adapted to engage a gasket 432 which is clamped between the casing 402 and the cover plate 415.

At the face side of the piston 422 there is a chamber 433 which is connected to a control passage 434 leading to the seat for the control slide valve 410. Contained in the piston chamber 433 is a movable stop member 436 which is adapted to engage the piston and which is subjected to the action of a spring 437 interposed between and engaging the stop member and a plug 438 having screw-threaded connection with the cover plate 430. The spring 437 acts to move the stop member 436 in the direction toward the piston 422, movement of the member in this direction being adapted to be limited by the engagement of an annular flange 439 on the member with the cover plate 430.

At the face side of the piston 423 there is a chamber 440 which is connected to a control passage 441 leading to the seat for the control slide valve 410. Contained in the piston chamber 440 is a stop member 443 which is adapted to engage the piston 423 and which is subject to the action of a spring 444 interposed between and engaging the stop member and a plug 445 having screw-threaded connection with the cover plate 415. The spring 444 acts to move the stop member 443 in the direction toward the piston 423, movement of the member in this direction being adapted to be limited by the engagement of an annular flange 446 on the member with the cover plate 415.

The valve seat, besides being provided with the emergency reservoir passage 147 is also provided with an auxiliary reservoir passage 33, an auxiliary reservoir charging passage 256, a quick service passage 289, a choked passage 356 which is adapted to control the rate of flow of fluid between the auxiliary and emergency reservoirs, a choked passage 264 which is also adapted to control the rate of flow of fluid between the auxiliary and emergency reservoirs, the flow area of the passage 264 being greater than that of the passage 356, so as to permit a sufficiently rapid flow of fluid from the emergency reservoir to the valve chamber of the equalizing valve device to insure the prompt movement of the equalizing valve device in graduating the release of the brakes, a release passage 271 leading from the seat for the equalizing main slide valve, a release passage 273 leading to the atmosphere by way of the retaining valve device 19, a release passage 354 leading from the seat for the equalizing main slide valve, an application passage 122, an application and release passage 226 and an application and release passage 189 connected through pipe 188 to the volume reservoir 8 and piston chamber of the relay valve device 7. It will be understood that the passages just enumerated correspond with the passages in the rotary valve seat of the change-over valve device disclosed in the aforementioned pending application and are indicated by reference characters which correspond with the reference characters used in the pending application. It will be noted, that while the passages correspond with the passages shown in the pending application, their arrangement has been changed in the present application in order to simplify the showing of the change-over slide valve 425 in its several conditioning positions.

*Control of the change-over valve device*

In the present embodiment of the invention, the operation of the change-over valve device to condition the equipment for either passenger, express or freight train service depends upon the pressure of fluid in the signal pipe 401, so that the signal pipe pressure will be different for each class of train service, for instance, in passenger train service the signal pipe will be charged with fluid at the usual pressure of about forty-five pounds, in express train service it will be charged to a pressure higher than forty-five pounds, say for instance to ninety pounds, and in freight train service will be at atmospheric pressure.

*Operation of change-over valve device to condition the fluid pressure brake equipment for passenger train service*

When a car equipped with a fluid pressure brake equipment embodying the invention is in passenger train service, fluid at signal pipe pressure supplied from the signal pipe 401 by way of pipe 406 to the diaphragm chamber 405 of the control valve mechanism of the change-over valve device, causes the flexible diaphragm 404 to flex inwardly, i. e., in a direction toward the right hand, shifting the stem 409 and associated control slide valve 410 in the same direction, such movement being yieldably opposed by the pressure of the spring 414, which pressure is transmitted to the stem 409 through the medium of the member 413. The movement of the stem 409 and control slide valve 410 continues until the stop member 413 is engaged by the stop member 417 when the spring 418, acting through the medium of the stop members 417 and 413, brings the stem and slide valve to a stop in the position in which they are shown in Fig. 2.

It will here be understood that when the stop member 413 and consequently the stem 409 and slide valve 410 are stopped as just described, these parts will be maintained in the position in which they are shown, by the action of the springs 414 and 418, against the normal signal pipe pressure of forty-five pounds applied to one side of the flexible diaphragm 404.

With the control slide valve 410 thus positioned, a cavity 447 therein connects the control passages 434, 441 and 427 together, and consequently fluid under pressure supplied from the emergency reservoir through passage 147 to the change-over slide valve chamber 426, flows to the piston chambers 433 and 440, and since the fluid pressures on opposite sides are permitted to equalize, the spring urged stops 436 and 443 will act to maintain the change-over pistons 422 and 423 and slide valve 425 in the position for conditioning the equipment for passenger train service.

With the change-over slide valve in the position in which it is shown in Fig. 2, the equipment will be conditioned for passenger train service. In this position a cavity 448 in the slide valve connects the passages 189 and 226, a cavity 449 connects the passages 122 and 289, a cavity 450 connects the passages 273 and 271, a cavity 451 connects the passages 33 and 256, a port 452 leading from the valve chamber 426 registers with the passage 264 and a branch 453 of the port 452 registers with the passage 340, and further the change-over slide valve laps the passages 356 and 354. It will be understood that the communications established by the change-over slide valve 425 are the same as those established by the rotary valve of the change-over device disclosed in the aforementioned pending application, so that the fluid pressure brake equipment is now in condition for passenger train service. The equipment when thus conditioned will function to control the brakes in the same manner as described in said pending application.

*Operation of change-over valve device to condition the fluid pressure brake equipment for express train service*

When the car is employed in express train service, the signal pipe pressure, being higher than forty-five pounds, causes the flexible diaphragm 404 to operate to shift the stem 409 and control slide valve 410 to their innermost position, as shown in Fig. 3, compressing first the spring 414 and then the spring 417. As the slide valve 410 is being moved beyond the position it assumes in passenger service, it uncovers the passage 434, so that fluid under pressure is now vented from the piston chamber 433, through said passage, the control slide valve chamber 407 and passage 408, to the atmosphere. As the slide valve 410 is thus being moved and as long as it is maintained in this position by fluid at signal pipe pressure, the cavity 447 connects the passages 427 and 441, so that the piston chamber 440 is maintained charged with fluid at emergency reservoir pressure.

The piston chamber 433 being thus vented, fluid at emergency reservoir pressure in the piston chamber 440 and acting on the face of the piston 423 causes the piston assembly, which includes the pistons 422 and 423, piston stem 424 and change-over slide valve 425, to shift in a direction toward the left hand to its extreme position against the opposing pressure of spring 437, as shown in Fig. 3, in which position, the annular seat rib on the piston 422 engages the gasket 429 and forms a seal adapted to prevent leakage of fluid from the emergency reservoir to the atmosphere in case there is leakage from the valve chamber 426 past the piston 422.

With the change-over valve thus positioned, the cavity 448 therein maintains the passages 189 and 226 connected together, a cavity 454 connects the passages 271 and 354 together and a port 455 leading from the valve chamber 426 registers with the passage 356, all of the other passages with the exception of the emergency reservoir passage 147 being lapped. The communications thus established by the change-over slide valve are the same as those established by the rotary valve of the change-over valve device disclosed in the aforementioned pending application, so that the fluid pressure brake equipment is now in condition for express train operation, and when thus conditioned will function to control the brakes in the same manner as described in said pending application.

*Operation of the change-over valve device to condition the fluid pressure brake equipment for freight train service*

In cars equipped especially for freight train service the signal pipe is omitted, so that when a car equipped with a fluid pressure brake equipment embodying the invention is employed in freight train service, the signal pipe 401 will be open to the atmosphere through the usual coupling hose at each end of the car, and consequently the signal pipe and connected diaphragm chamber 405 will be at atmospheric pressure.

With the diaphragm 405 at atmospheric pressure, the spring 414 acting through the medium of the stop member 413 maintains the stem 409 and control slide valve 410 in their extreme outer position, as shown in Fig. 4, in which position the diaphragm 404 may engage a stop lug 456 on the cover plate 430.

With the control slide valve 410 thus positioned, the control passage 441 and consequently the piston chamber 440 are connected to the atmosphere by way of valve chamber 407 and passage 408. Further, with the slide valve in this position, the cavity 447 therein connects the passages 427 and 434 so that fluid at emergency reservoir pressure in the change-over slide valve chamber 426 is supplied to the piston chamber 433 causing the piston assembly, which comprises the pistons 422 and 423, piston stem 424 and change-over slide valve 425, to shift in a direction toward the right hand against the resistance offered by the spring 444 acting through the medium of the stop 443, as shown in Fig. 4, in which position the seat rib 431 on the piston 423 engages the gasket 432 to form an air tight seal for preventing leakage of fluid from the emergency reservoir to the atmosphere in case there is leakage from the valve chamber 426 past the piston 423.

With the change-over slide valve 425 thus positioned, the cavity 454 connects the passages 271 and 354 together and the port 452 registers with the passage 356, all of the other passages, with the exception of the emergency reservoir passage 147 are lapped. The communications thus established by the change-over slide valve are the same as those established by the rotary valve of the change-over valve device disclosed in the aforementioned pending application, so that the fluid pressure brake equipment is now conditioned for freight train service, and when so conditioned will function to control the brakes in the same manner as described in said pending application.

*Operations of the change-over valve device other than those hereinbefore described*

When a car equipped with the invention is removed from either a passenger train or an express train, the spring 414 acts to move the stem 409, control slide valve 410 and flexible diaphragm 404 in the direction toward the left hand to their extreme outer position. With the control slide valve in this position and the emergency reservoir charged, the change-over piston will be caused to make its full traverse in the direction toward the right hand, as shown in Fig. 4. Now, when the car is placed in a train to be used in any of the three classes of service hereinbefore mentioned, the control valve mechanism will cause the change-over valve mechanism to assume its proper conditioning position for the service in which the equipment is employed, all of which will be readily understood from the foregoing description of the several operations of the change-over valve device.

When the equipment is completely depleted of fluid pressure, as may be the case when a car has not been in use for some time, the spring 444, due to the emergency reservoir and consequently the change-over slide valve chamber 426 and piston chamber 433 being at substantially atmospheric pressure, will cause the change-over valve mechanism to move to the position in which it is shown in Fig. 2. From the foregoing description, it will be seen that when the equipment is placed in a train and charged with fluid under pressure, the several parts of the change-over valve device will be caused to assume their proper position for the service in which the train is employed.

It will here be understood that the value of the spring 414 is such that it is not capable of moving the stem 40, control slide valve 410 and flexible diaphragm 404 to their extreme outer position until the signal pipe pressure has been reduced to a pressure below ten pounds, which is well below the pressure to which the signal pipe may be reduced in effecting train signals in passenger train service. By reason of this a signal pipe reduction to effect a train signal will not cause the several parts of the change-over valve device to be unintentionally moved to the position for conditioning the equipment for freight train service.

*Description of the change-over valve device shown in Figs. 5 to 10, inclusive*

In Figs. 5 to 10, inclusive, of the drawings, another form of the change-over valve device is shown which is quite similar to the corresponding device shown in Figs. 1 to 4, inclusive, having a control valve mechanism which in construction and function, is identical with the control valve mechanism of the change-over valve device shown in Figs. 1 to 4, inclusive, and having a change-over valve mechanism which differs from the change-over valve mechanism of the device shown in Figs. 1 to 4, inclusive, in that a change-over rotary valve 460 and an operating arm 461 therefor are employed instead of the change-over slide valve 425, and the stem 424 of the change-over piston assembly is provided with an opening 462 for the reception of the free end of the operating arm 461, said arm being operative by the piston assembly to rotate the valve 460 to any one of its three positions.

The ports and cavities in the rotary valve 460 and the passages in the seat for the rotary valve are identical in every way with those shown and described in the aforementioned pending application and are indicated by reference characters corresponding to those employed in the pending application.

It will be noted that the passages in the seat for the rotary valve 460 correspond with those in the seat for the slide valve 425, but are arranged differently to accommodate the rotary valve. The ports and cavities in the rotary valve and their arrangement differ from those in the slide valve 425, but it is to be understood both the slide valve and the rotary valve function to control the several passages leading to their seats in the same manner.

The operation of the control valve mechanism and the change-over piston assembly of this form of change-over valve device to condition the fluid pressure brake equipment is identical with that of the corresponding mechanism and piston assembly of the change-over valve device shown in Figs. 1 to 4, inclusive, and in view of this a detailed description of the operation of this form of change-over valve device is deemed unnecessary.

With the rotary valve 460 in position for conditioning the equipment for passenger train service, the cavity 266 connects the passages 189 and 226 together, the cavity 290 connects the passages 122 and 289 together, the cavity 272 connects the passages 273 and 271 together, the cavity 258 connects the passages 256 and 33 together, the port 341 connects the change-over valve chamber 426 to the passage 340 and the port 265 connects the change-over valve chamber 426 to the passage 264.

With the rotary valve 460 in position for conditioning the equipment for express train service, the cavity 266 connects the passages 189 and 226 together, the cavity 353 connects the passages 273 and 354 together, and the port 355 connects the change-over valve chamber 426 to the passage 356.

With the rotary valve 460 in position for conditioning the equipment for freight train service, the cavity 353 connects the passages 273 and 354 together and the port 355 connects the change-over valve chamber 426 to the passage 356.

From the above, it will be understood that the rotary valve 460 is adapted to establish the same communications as are adapted to be established by the change-over slide valve 425 and by the rotary valve of the change-over valve device disclosed in the aforementioned pending application.

While two illustrative embodiments of our invention have been described in detail, it is not our intention to limit its scope to these embodiments or otherwise than by the terms of the appended claims.

Having now described our invention, what we claim as new and desire to secure by Letters Patent, is:

1. In combination with a fluid pressure brake equipment characterized by the use of a single brake controlling valve device adapted to be conditioned to function for different classes of service, a signal pipe carrying fluid at a different pressure in each of said classes of service, a change-over mechanism having positions for conditioning the brake controlling valve device for said classes of service and being selectively operative to any one of said positions, and means subject to the pressure of fluid in said signal pipe for controlling the operation of said change-over mechanism.

2. In combination with a fluid pressure brake equipment characterized by the use of a single brake controlling valve device and adapted to be conditioned to function for different classes of service, a chamber carrying fluid at a different pressure in each class of service, and a change-over valve mechanism having positions for conditioning the brake controlling valve device and thereby the fluid pressure brake equipment for said classes of service and being operative by fluid under pressure to any one of said positions, and means subject to fluid at a certain pressure in said chamber for effecting the operation of the change-over valve mechanism to one of said positions, and subject to fluid at a lower pressure in said chamber for effecting the operation of the change-over valve mechanism to another of said positions and subject to fluid in said chamber at a higher pressure than said certain pressure for effecting the operation of the change-over valve mechanism to another of said positions.

3. In combination with a fluid pressure brake equipment adapted to be conditioned to function for different classes of service and characterized by the use of a single brake controlling valve device, a chamber carrying fluid at a different pressure in each class of service, and a change-over valve mechanism having positions for conditioning the brake controlling valve device and thereby the fluid pressure brake equipment for said classes of service and being operative by fluid under pressure to any one of said positions, means subject to fluid at a certain pressure in said chamber for effecting the operation of the change-over valve mechanism to one of said positions and subject to a higher pressure in said chamber for effecting the operation of the change-over valve mechanism to another of said positions, and means for shifting the first mentioned means, to effect the operation of the change-over valve mechanism to another of said positions, when the pressure of fluid in said chamber is lower than said certain pressure.

4. In combination with a fluid pressure brake equipment adapted to be conditioned to function for different classes of service, a control chamber carrying fluid at a different pressure in each class of service, a change-over valve mechanism having positions for conditioning the fluid pressure brake equipment for said classes of service and being operative by fluid under pressure, valve means operative by fluid at a certain pressure in said chamber to a position to effect the operation of the change-over valve mechanism to one of its conditioning positions and operative by fluid at a pressure higher than said certain pressure to another position to effect the operation of the change-over valve mechanism to another of its conditioning positions and operative to another position when the pressure of fluid in said chamber is lower than said certain pressure to effect the operation of the change-over valve mechanism to another of its conditioning positions, and means opposing the movement of said valve means to either one of the first two mentioned positions and operative to move said valve means to the third mentioned position when the chamber pressure is lower than said certain pressure.

5. In combination with a fluid pressure brake equipment adapted to be conditioned to function for different classes of service, a control chamber carrying fluid at a different pressure in each class of service, a change-over valve mechanism having positions for conditioning the fluid pressure brake equipment for said classes of service and being operative by fluid under pressure, valve means operative by fluid at a certain pressure in said chamber to a position to effect the operation of the change-over valve mechanism to one of its conditioning positions and operative by fluid at a pressure higher than said certain pressure to another position to effect the operation of the change-over valve mechanism to another of its conditioning positions and operative to another position when the pressure of fluid in said chamber is lower than said certain pressure to effect the operation of the change-over valve mechanism to another of its conditioning positions, and means opposing movement of said valve means to its first mentioned position and operative to move said valve means to the third mentioned position when the opposing force of the means exceeds the pressure of fluid in said chamber.

6. In combination with a fluid pressure brake equipment adapted to be conditioned to function for different classes of service, a control chamber carrying fluid at a different pressure in each class of service, a change-over valve mechanism having positions for conditioning the fluid pressure brake equipment for said classes of service and being operative by fluid under pressure, valve means operative by fluid at a certain pressure in said chamber to a position to effect the operation of the change-over valve mechanism to one of its conditioning positions and operative by fluid at a pressure higher than said certain pressure to another position to effect the operation of the change-over valve mechanism to another of its conditioning positions and operative to another position when the pressure of fluid in said chamber is lower than said certain pressure to effect the operation of the change-over valve mechanism to another of its conditioning positions, and spring means opposing movement of said valve means to its first mentioned position and operative to move said valve means to the third mentioned position when the opposing force of the spring means exceeds the pressure of fluid in said chamber.

7. In a combination with a fluid pressure brake equipment adapted to be conditioned to function for different classes of service, a control chamber carrying fluid at a different pressure in each class of service, a change-over valve mechanism having positions for conditioning the fluid pressure brake equipment for said classes of service and being operative by fluid under pressure, valve means operative by fluid at a certain pressure in said chamber to a position to effect the operation of the change-over valve mechanism to one of its conditioning positions and operative by fluid at a pressure higher than said certain pressure to another position to effect the operation of the change-over valve mechanism to another of its conditioning positions and operative to another position when the pressure of fluid in said chamber is lower than said certain pressure to effect the operation of the change-over valve mechanism to another of its conditioning positions, spring means yieldably opposing movement of said valve means to its first mentioned position, and additional spring means for stopping said valve means in its first mentioned position and yieldably opposing movement of the valve means to its second mentioned position, the first mentioned spring means being adapted to move the valve means to its third mentioned position when the pressure of fluid in said chamber is less than the opposing pressure of the spring means.

8. In combination with a fluid pressure brake equipment characterized by the use of a single brake controlling valve device having certain brake controlling functions common to three classes of train service, and being adapted to be changed over or conditioned to have other brake controlling functions to render the equipment effective to control the brakes in any particular one of said classes of train service, a chamber carrying fluid at a different pressure in each of said classes of train service, and means operable automatically according to the pressure of fluid in said chamber for conditioning said equipment for the particular class of service in which the equipment is employed.

9. In combination with a fluid pressure brake equipment characterized by the use of a single brake controlling valve device comprising a triple valve portion and an emergency portion having certain brake controlling functions common to three classes of train service and being adapted to be changed over or conditioned to have other brake controlling functions to render the equipment effective to control the brakes in any particular one of said classes of train service, a chamber carrying fluid at a different pressure in each of said classes of train service, and means operable according to the pressure of fluid in said chamber for conditioning said brake controlling valve device for the particular class of service in which the equipment is employed.

10. In combination with a fluid pressure brake equipment characterized by the use of a single brake controlling valve device having certain brake controlling functions common to passenger, express and freight train service, and being adapted to be changed over or conditioned to have other brake controlling functions to render the equipment effective to control the brakes in any particular one of said classes of train service, a chamber carrying fluid at a different pressure in each of said classes of train service, and means operable according to the pressure of fluid in said chamber and independently of the operation of the brake controlling valve device for conditioning said equipment for the particular class of service in which the equipment is employed.

11. In combination with a fluid pressure brake equipment characterized by the use of a single brake controlling valve device having certain brake controlling functions common to passenger, express and freight train service and being adapted to be changed over or conditioned to have other brake controlling functions to render the equipment effective to control the brakes in any particular one of said classes of train service, a chamber carrying fluid at a different pressure in each of said classes of train service, and means operable automatically according to the pressure of fluid in said chamber for conditioning said brake controlling valve device for the particular class of service in which the equipment is employed.

12. In a fluid pressure brake equipment, in combination, a brake pipe, a brake controlling valve device comprising a piston subject at all times to brake pipe pressure and operative upon a reduction in brake pipe pressure to effect an application of the brakes and operative upon a subsequent increase in brake pipe pressure to effect a release of the brakes, said brake controlling valve device having a plurality of sets of fluid conducting communications each of which sets of communications is adapted to condition the equipment to provide different braking characteristics than another of said sets, and means automatically operable upon connecting the equipment in a train to select the set of communications for conditioning the equipment to provide the braking characteristics for the particular class of train service in which the equipment is employed.

13. In a fluid pressure brake equipment, in combination, a brake pipe, a brake controlling valve device comprising a piston subject at all times to brake pipe pressure and operative upon a reduction in brake pipe pressure to effect an application of the brakes and operative upon a subsequent increase in brake pipe pressure to effect a release of the brakes, said brake controlling valve device having a plurality of sets of fluid conducting communications each of which sets of communications is adapted to condition the equipment to provide different braking characteristics than another of said sets, means automatically operable upon connecting the equipment in a train to select the set of communications for conditioning the equipment to provide the braking characteristics for the particular class of train service in which the equipment is employed, said means comprising a control element for selecting the proper set of communications, a motor for positioning the control element, a signal pipe, and a pilot mechanism responsive to signal pipe pressure for effecting the operation of said motor.

14. In a fluid pressure brake equipment, in combination, a brake pipe, a brake controlling valve device comprising a piston subject at all times to brake pipe pressure and operative upon a reduction in brake pipe pressure to effect an application of the brakes and operative upon a subsequent increase in brake pipe pressure to effect a release of the brakes, said brake controlling valve device having a plurality of sets of fluid conducting communications each of which sets of communications is adapted to condition the equipment to provide different braking characteristics than another of said sets, and means automatically operable upon connecting the equipment in a train to select the set of communications for conditioning the equipment to provide the braking characteristics for the particular class of train service in which the equipment is employed, said means comprising a control element for selecting the proper set of communications, a motor for positioning the control element, a signal pipe, and means operative by fluid at signal pipe pressure for effecting the operation of said motor to one control position and operative in the absence of signal pipe pressure for effecting the operation of the motor to another control position.

15. In a fluid pressure brake equipment, in combination, a brake pipe, a brake controlling valve device comprising a piston subject at all times to brake pipe pressure and operative upon a reduction in brake pipe pressure to effect an application of the brakes and operative upon a subsequent increase in brake pipe pressure to effect a release of the brakes, said brake controlling valve device having a plurality of sets of fluid conducting communications each of which sets of communications is adapted to condition the equipment to provide different braking characteristics than another of said sets, and means automatically operable upon connecting the equipment in a train to select the set of communications for conditioning the equipment to provide the braking characteristics for the particular class of train service in which the equipment is employed, said means comprising a control element for selecting the proper set of communications, a motor for positioning the control element, a signal pipe, and means operative by fluid at a certain signal pipe pressure for effecting the operation of said motor to one of its control positions and operative by fluid at a higher signal pipe pressure for effecting the operation of the motor to another of its control positions and operative in the absence of signal pipe pressure for effecting the operation of said motor to still another control position.

16. In a fluid pressure brake equipment, in combination, a brake pipe, a brake controlling valve device comprising a piston subject at all times to brake pipe pressure and operative upon a reduction in brake pipe pressure to effect an application of the brakes and operative upon a subsequent increase in brake pipe pressure to effect a release of the brakes, said brake controlling valve device having a plurality of communications arranged to condition the equipment to provide passenger train braking characteristics and means automatically operative according to signal pipe pressure for cutting off certain of said communications and establishing other communications to condition the equipment to provide freight train braking characteristics.

17. In a fluid pressure brake equipment, in combination, a brake pipe, a brake controlling valve device comprising a piston subject at all times to brake pipe pressure and operative upon a reduction in brake pipe pressure to effect an application of the brakes and operative upon a subsequent increase in brake pipe pressure to effect a release of the brakes, said brake controlling valve device having a plurality of communications arranged to condition the equipment to provide passenger train braking characteristics, some of said communications being adapted to be cut off and others modified to condition the equipment to provide freight train braking characteristics, means shiftable to one position to provide the communication arrangement for passenger train operation and shiftable to another position to provide the communication arrangement for freight train operation, a signal pipe which is charged with fluid under pressure in passenger train service and not in freight train service, and means responsive to signal pipe pressure for controlling the operation of the shiftable means.

18. In a fluid pressure brake, in combination, a brake pipe, a brake controlling valve device having an actuating piston which is at all times subject to brake pipe pressure, said brake controlling valve device being convertible to condition the equipment for either passenger train braking or freight train braking, said piston being operative in both classes of service, and means automatically operative upon connecting the equipment in a passenger train and in a freight train to effect conversion of said valve device for the class of train service in which the equipment is employed.

19. In a fluid pressure brake, in combination, a brake pipe, a brake controlling valve device having an actuating piston which is at all times subject to brake pipe pressure, said brake controlling valve device being convertible to condition the equipment for either passenger train braking or freight train braking, said piston being operative in both classes of service, a signal pipe adapted to be charged with fluid under pressure in passenger train service and not in freight train service, means operative to effect the conversion of said brake controlling valve devices and responsive to signal pipe pressure for effecting the operation of said means.

20. In a fluid pressure brake equipment, in combination, a brake pipe, a brake controlling valve device operative to control the brakes in each of a plurality of classes of train service and comprising an actuating piston subject at all times to brake pipe pressure and operative in each of said classes of train service upon variations in brake pipe pressure for controlling the application and release of the brakes, said brake controlling valve device having at least two sets of fluid conducting communications one of which sets is adapted to condition the equipment for freight train braking and another of which sets is adapted to condition the equipment for passenger train braking, means operable to select either one of said sets of communications for use, and means operable automatically upon connecting the equipment in either a train in freight service or a train in passenger service for effecting the operation of said means to select the corresponding set of communications for use.

21. In a fluid pressure brake, the combination of a brake pipe; a brake controlling valve device having an actuating piston subject to brake pipe pressure, said valve device being convertible from a normal functional condition, in which it affords freight braking characteristics, to a functional condition in which it affords passenger braking conditions, said valve device being operated by said piston in both said functional conditions; a signal pipe; and means rendered effective by the presence of pressure in said signal pipe to convert said valve from said normal to the second named functional condition.

22. In a fluid pressure brake the combination of a brake pipe; a brake controlling valve device connected therewith and having two sets of ports, one set affording freight braking characteristics and the other set affording passenger braking characteristics; means operable to select either of said sets of ports for use; and means conditioned as an incident to connection in a freight train and in a passenger train to operate said means diversely.

23. In a fluid pressure brake the combination of a brake pipe; a brake controlling valve device connected therewith and having two sets of ports, one set affording freight braking characteristics and the other set affording passenger braking characteristics; means operable to select either of said sets of ports for use; a signal pipe; and means responsive to the presence and absence of pressure in said signal pipe to operate said means diversely.

24. In a fluid pressure brake the combination of a brake pipe; a brake controlling valve device connected therewith and having an actuating piston always subject to brake pipe pressure, a port for causing graduated release and a port for causing full release; means shiftable between two positions in which respectively it renders said ports selectively operative; a signal pipe; and means responsive to pressure in the signal pipe and controlling said shiftable means to render the first-named port operative when the signal pipe is under pressure, and the second-named port operative at other times.

25. In a fluid pressure brake the combination of a brake pipe; a brake controlling valve device connected therewith and having an application port provided with pressure build-up delaying means and a by-pass around said means; valve means operable to open and close said by-pass; a signal pipe; and means responsive to pressure in the signal pipe and serving to open said valve means when the signal pipe is under pressure and close the valve means at other times.

26. In a fluid pressure brake system the combination of a signal pipe; a brake pipe; a brake controlling valve device connected therewith and having a piston subject to brake pipe pressure and shiftable in response to pressure changes in the brake pipe to apply the brakes and completely release the brakes; and pressure operated means rendered active by the existence of pressure in the signal pipe to subject said piston to modifying pressures during release and thereby impart a release graduating characteristic to said valve device.

27. In a fluid pressure brake, the combination of a brake pipe; an auxiliary reservoir; a brake cylinder; a single triple valve connected therewith; a signal pipe which is charged in one class of service and not in another; controlling means for changing the application characteristics of said triple valve; and means responsive to signal pipe pressure for actuating said controlling means.

28. In a fluid pressure brake, the combination of a brake pipe; an auxiliary reservoir; a brake cylinder; a triple valve connected therewith; a signal pipe which is charged in one class of service and not in another; controlling means for changing the application and release characteristics of said triple valve; and means responsive to signal pipe pressure for actuating said controlling means.

29. In a fluid pressure brake, the combination of a brake pipe; an auxiliary reservoir; a brake cylinder; a triple valve connected therewith; a signal pipe which is charged in one class of service and not in another; controlling means for changing the application characteristics of said triple valve; a reversible motor for shifting said controlling means; a pilot valve for reversing said motor; and means responsive to signal pipe pressure for actuating said pilot valve.

30. In a fluid pressure brake the combination of a brake pipe; an auxiliary reservoir; a brake cylinder; a triple valve connected therewith; a signal pipe which is charged in one class of service and not in another; controlling means for changing the release characteristics of said triple valve; a reversible motor for shifting said controlling means; a pilot valve for reversing said motor; and means responsive to signal pipe pressure for actuating said pilot valve.

31. In a fluid pressure brake, the combination of a brake pipe; an auxiliary reservoir; a brake cylinder; a triple valve connected therewith; a signal pipe which is charged in one class of service and not in another; controlling means for changing the application and release characteristics of said triple valve; a reversible motor for shifting said controlling means; a pilot valve for reversing said motor; and means responsive to signal pipe pressure for actuating said pilot valve.

32. In a fluid pressure brake, the combination of a brake pipe; a brake controlling valve device having an actuating piston subject to brake pipe pressure, said valve device being convertible between two functional conditions, in one of which it affords freight braking characteristics, in the other of which it affords passenger braking characteristics and in both of which it is actuated by said piston; and means rendered effective as an incident to connection in a freight train, and in a passenger train, to convert said valve to the appropriate functional condition.

33. In a fluid pressure brake, the combination of a brake pipe; a brake controlling valve device having an actuating piston subject to brake pipe pressure, said valve device being convertible between two functional conditions, in one of which it affords freight braking characteristics, in the other of which it affords passenger braking characteristics and in both of which it is actuated by said piston; a signal pipe; and means responsive to fluid pressure in the signal pipe to control the conversion of said valve device between said functional conditions.

34. In a fluid pressure brake, the combination of a brake pipe; a brake controlling valve device having an actuating piston subject to brake pipe pressure, said valve device being convertible from a normal functional condition, in which it affords freight braking characteristics, to a functional condition in which it affords passenger braking conditions, said valve device being operated by said piston in both said functional conditions; and means rendered operative by connection in a passenger train to convert said valve from said normal to the second named functional condition.

35. In a fluid pressure brake, in combination, a brake pipe, a brake controlling valve device connected therewith and having two sets of ports, one set affording freight braking characteristics, means operable to select either of said sets of ports for use, means conditioned as an incident to connection in a passenger train to operate said means to connect the set of ports affording passenger braking characteristics and conditioned as an incident to disconnection from a passenger train to operate said means to connect the set of ports affording freight characteristics.

36. In a fluid pressure brake, in combination, a brake pipe, a brake controlling valve device having an actuating piston subject to brake pipe pressure, said valve device being convertible between a plurality of functional conditions, in each of which it affords different braking characteristics and in all of which it is actuated by said piston, and means rendered effective as an incident to connection in a train to convert said valve device to the appropriate functional condition for the train.

37. In a fluid pressure brake, in combination, a brake pipe, a brake controlling valve device having an actuating piston subject to brake pipe pressure, said valve device being convertible between a plurality of functional conditions, in each of which it affords different braking characteristics and in all of which it is actuated by said piston, and means normally conditioned to the appropriate functional condition for one class of train service and rendered effective as an incident to connection in train in another class of train service to convert said valve device to the appropriate functional condition for the train.

CLYDE C. FARMER.
ELLIS E. HEWITT.